(12) United States Patent
Haddad et al.

(10) Patent No.: US 9,185,071 B2
(45) Date of Patent: Nov. 10, 2015

(54) METHODS AND SYSTEMS FOR SEAMLESS NETWORK COMMUNICATIONS BETWEEN DEVICES RUNNING INTERNET PROTOCOL VERSION 6 AND INTERNET PROTOCOL VERSION 4

(71) Applicant: TELEFONAKTIEBOLAGET L M ERICSSON (PUBL), Stockholm (SE)

(72) Inventors: Wassim Haddad, San Jose, CA (US); Joel Halpern, Leesburg, VA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 291 days.

(21) Appl. No.: 13/732,044

(22) Filed: Dec. 31, 2012

(65) Prior Publication Data

US 2014/0189160 A1    Jul. 3, 2014

(51) Int. Cl.
 *H04L 29/12* (2006.01)
 *H04W 80/04* (2009.01)
 *H04W 36/00* (2009.01)

(52) U.S. Cl.
 CPC ........ *H04L 61/2007* (2013.01); *H04L 61/2084* (2013.01); *H04L 61/251* (2013.01); *H04L 61/6004* (2013.01); *H04W 36/0016* (2013.01); *H04W 80/045* (2013.01); *H04L 61/1511* (2013.01)

(58) Field of Classification Search
 CPC ................................ H04L 29/12; H04L 61/25
 USPC .......................................................... 709/245
 See application file for complete search history.

(56) References Cited

U.S. PATENT DOCUMENTS

2012/0005372 A1 *  1/2012  Sarikaya et al. ............... 709/245

OTHER PUBLICATIONS

R. Atkinson (A Revised Overview of the Identifier-Locator Network Protocol (ILNP) , Oct. 28, 2005 ).*
S Gundavelli et al. (RFC 5213 Aug. 2008).*

* cited by examiner

*Primary Examiner* — David Lazaro
*Assistant Examiner* — Zia Khurshid

(57) ABSTRACT

Systems are provided including at least one identifier locator network protocol (ILNP) enabled mobile node running Internet protocol version 6 (IPv6). The mobile node is attached to an IPv6 network in an IPv6 domain. The system includes a virtual root server configured to receive a binding identifiers create (BIC) message from a domain name system 64 (DNS64) server associated with the IPv6 network. The BIC message includes an ILNP address of the mobile node running IPv6, a fake ILNP address of a destination device running IPv4 assigned by the DNS64 server and an ILNP address of the DNS64 server. The fake ILNP address includes a full real address of the destination device. The virtual root server is further configures to create a binding between the ILNP address of the mobile node and the fake ILNP address of the destination device; store the binding; and send a binding identifier acknowledgement (BIA) message to the DNS64 server.

25 Claims, 12 Drawing Sheets

METHODS AND SYSTEMS FOR SEAMLESS NETWORK COMMUNICATIONS BETWEEN DEVICES RUNNING INTERNET PROTOCOL VERSION 6 AND INTERNET PROTOCOL VERSION 4

TECHNICAL FIELD

The present inventive concept generally relates to communication systems and, more particularly, to systems and methods for seamless communications between identifier locator network protocol (ILNP) enabled mobile communication devices and existing internet protocol version 4 (IPv4) communication devices.

BACKGROUND

The identifier locator network protocol (ILNP) is a network protocol designed to separate the two functions of network addresses, the identification of network endpoints and assisting routing by separating topological information from node identity. Thus, ILNP provides transport layers a static identifier (i.e. name), which allows seamless mobility and multi-homing. ILNP is backwards-compatible with existing internet protocol (IP). ILNP itself is an architecture with two different instantiations at present. ILNP is ILNP engineered as a set of Internet protocol version 6 (IPv6) extensions. ILNP is expected to coexist with both IPv4 and IPv6 at least during the early phase of deployment. Thus, the ability to enable connectivity between IPv6-only end user devices and IPv4 destinations is desirable.

SUMMARY

It is therefore an object to provide seamless communications between systems running different versions of Internet protocols.

Various embodiments provide systems including at least one identifier locator network protocol (ILNP) enabled mobile node running Internet protocol version 6 (IPv6). The mobile node is attached to an IPv6 network in an IPv6 domain. The system includes a virtual root server configured to receive a binding identifiers create (BIC) message from a domain name system 64 (DNS64) server associated with the IPv6 network. The BIC message includes an ILNP address of the mobile node running IPv6, a fake ILNP address of a destination device running IPv4 assigned by the DNS64 server and an ILNP address of the DNS64 server. The fake ILNP address includes a full real address of the destination device. The virtual root server is further configured to create a binding between the ILNP address of the mobile node and the fake ILNP address of the destination device; store the binding; and send a binding identifier acknowledgement (BIA) message to the DNS64 server.

A potential advantage of this approach is an increased likelihood of seamless connectivity between Internet protocol version 6 (IPv6) only end user devices and Internet Protocol version 4 (IPv4) destinations by enabling a full ILNP session therebetween.

Other embodiments provide methods for communicating between at least one identifier locator network protocol (ILNP) enabled mobile node running Internet protocol version 6 (IPv6) and a destination device running IPv4. The mobile node is attached to an IPv6 network in an IPv6 domain. The method includes receiving, at a virtual root server, a binding identifiers create (BIC) message from a domain name system 64 (DNS64) server associated with the IPv6 network. The BIC message includes an ILNP address of the mobile node running IPv6, a fake ILNP address of a destination device running IPv4 assigned by the DNS64 server and an ILNP address of the DNS64 server. The fake ILNP address includes a full real address of the destination device. The method further includes creating a binding between the ILNP address of the mobile node and the fake ILNP address of the destination device; storing the binding; and sending a binding identifier acknowledgement (BIA) message to the DNS64 server.

Other methods and systems according to embodiments of the inventive concept will be or become apparent to one with skill in the art upon review of the following drawings and detailed description. It is intended that all such additional methods and apparatuses be included within this description, be within the scope of the present inventive concept, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the inventive concept. In the drawings.

DETAILED DESCRIPTION

Figure 1:
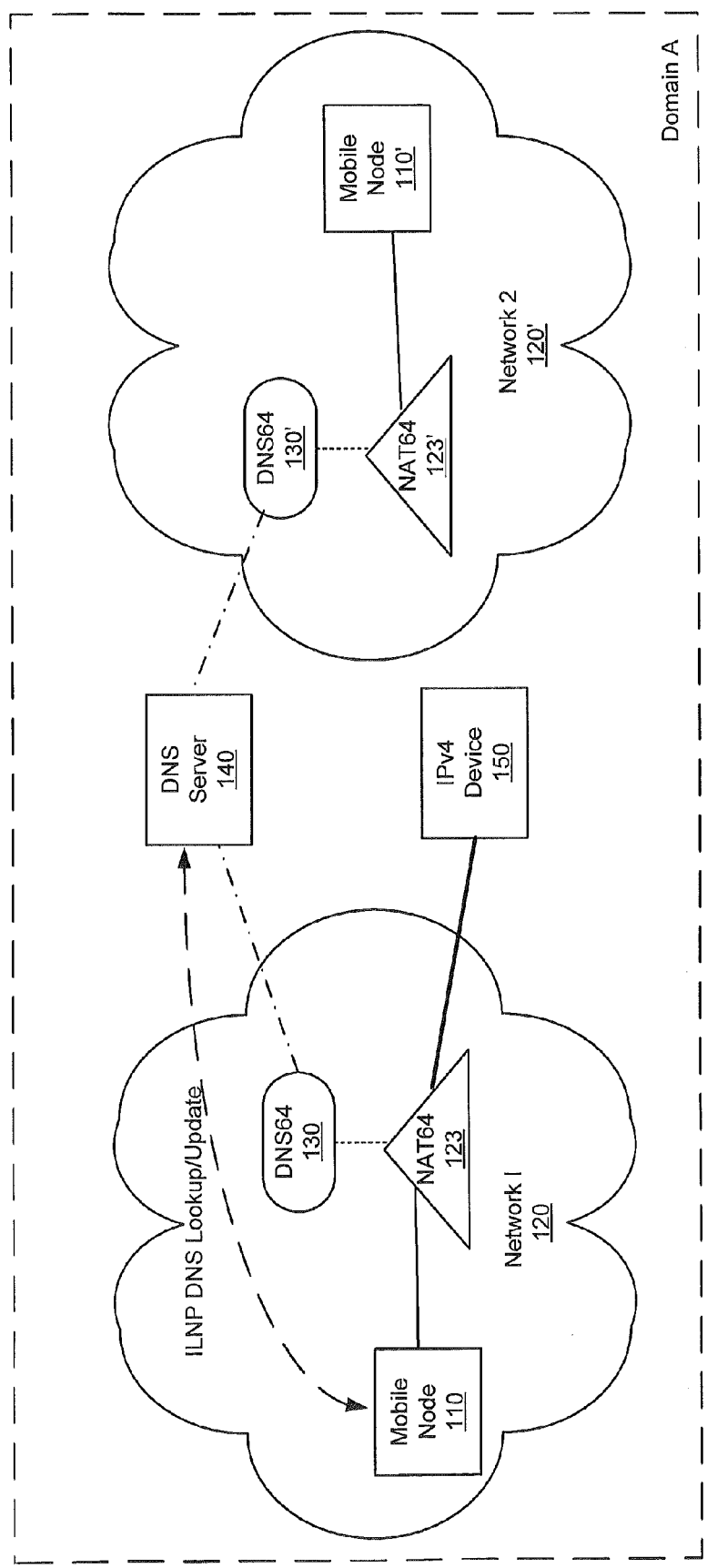
FIG. 1 is a block diagram of a conventional communications system.

The present inventive concept now will be described more fully hereinafter with reference to the accompanying drawings, in which embodiments of the inventive concept are shown. However, this inventive concept is not to be construed as limited to the embodiments set forth herein.

Identifier locator network protocol (ILNP) is an identifier locator split protocol embedded in Internet protocol version 6 (IPv6). ILNP is a host centric solution, which typically requires no update to the operator's network infrastructure. As discussed above, the identifier locator network protocol (ILNP) is a network protocol designed to separate the two functions of network addresses. Thus, an ILNP address has both an identifier portion, which is static, and a locator portion, which is dynamic, i.e., it changes based on the current location of the mobile node in the network. ILNP provides the transport layers of the system with the static identifier, for example, a name of the user device, which allows seamless mobility and multi-homing as will be discussed further herein. The identifier portion of the ILNP address is 64 bits long. The identifier portion it not topologically significant and names a logical/virtual/physical node, not an interface. The identifier portion remains constant during the lifetime of the transport session. Multiple identifiers can be used by a node, but not during the same transport session. The locator portion of the ILNP address, on the other hand, is dynamic and, therefore, can change value during the lifetime of the transport session and multiple locators can be used simultaneously. A locator portion of the ILNP address enables mobility, multi-homing and multi-path transport protocol.

As used herein, a "transport session" refers to an established connection between two hosts/systems/nodes. When a mobile node tries to connect to a destination node there is a negotiation that happens between the mobile node and/or the related system and the destination node/system. In brief, the negotiation involves the terms of how data will be transferred between the mobile node and the destination node. Once the negotiation is complete, data transfer between the nodes can begin over the established "transport session." This session can be terminated when communication between the nodes is complete. Thus, as discussed above, the identifier portion of the ILNP address remains static for a given node during the transport session. However, the same node can have a different identifier portion during a different session, for example, if the session is terminated and then a new session is established, the same node may have two different identifier portions. The locator portion of the ILNP address is dynamic within the session and can change based on the current position of the mobile node.

ILNP is incrementally deployable and is expected to coexist with IPv6 and Internet Protocol version 4 (IPv4). In other words, although IPv6 is being developed, IPv4 may remain in use. Thus, a mechanism is needed to enable connectivity between IPv6-only end user devices, and IPv4 destinations. Currently, a network address translator 64 (NAT64) technology has been developed to enable connectivity between the IPv6 and IPv4 devices, which will be discussed with respect to FIGS. 1 and 2 below.

Figure 2:
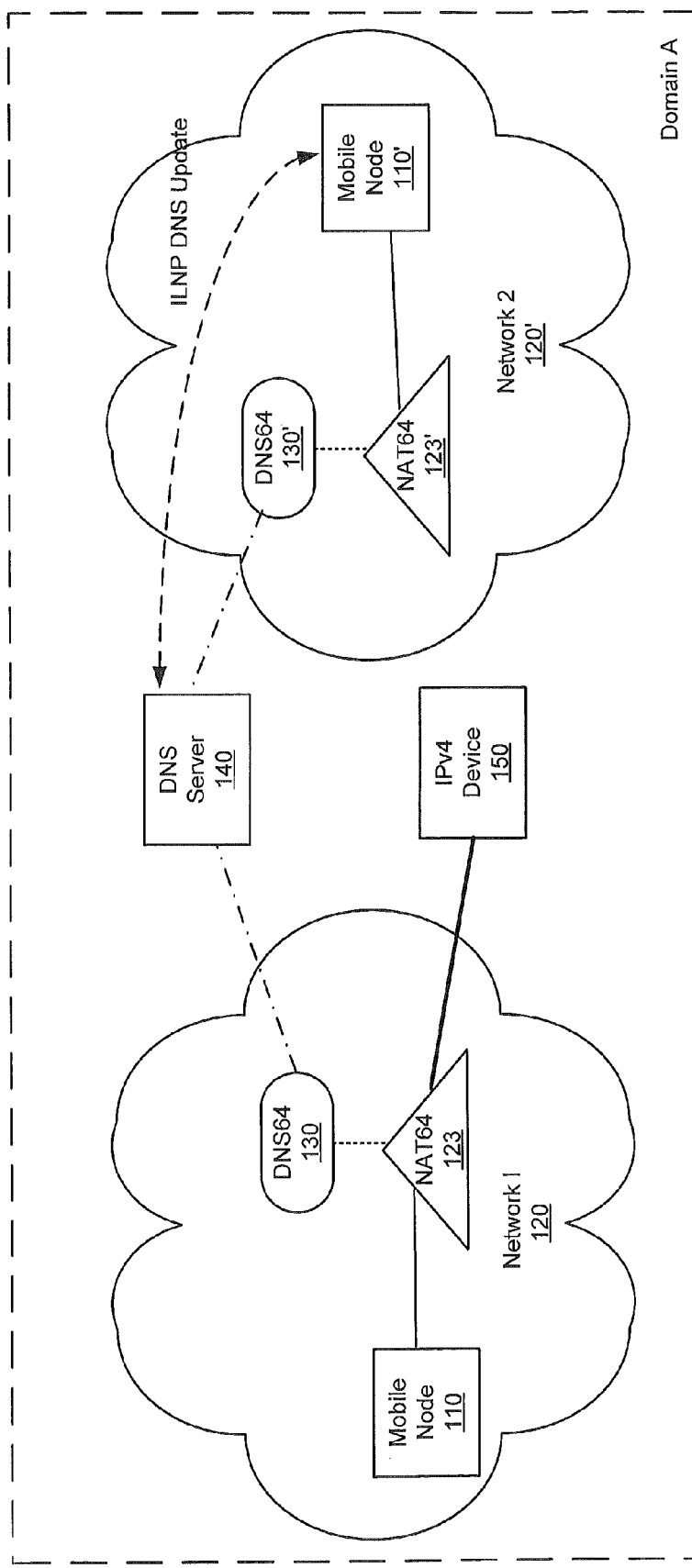
FIG. 2 is a block diagram of a conventional communications system.

As illustrated in FIGS. 1 and 2, Domain A includes first and second networks 120, 120', a domain name server (DNS) server 150 and an IPv4 device 150. As further illustrated in FIG. 1, each network 120, 120' in Domain A includes a mobile node 110, 110', an NAT64 123, 123' and a domain name server 64 (DNS64) 130, 130'. The mobile node 110, 110' is an ILNP-enabled mobile node, which is attached to an ILNP enabled network 120, 120'. As illustrated, the NAT64 123 communicates with the DNS64, which is configured to convert an IPv4 address to a "fake" IPv6 address. As used herein, a "fake" address refers to an address created by the system such that an IPv4 device looks like an IPv6 device to the IPv6 devices trying to communicate therewith. This facilitates communication between the IPv6 device and the IPv4 device. Thus, when the mobile node 110, 110', which is an IPv6 device, establishes contact with the IPv4 destination device 150, the DNS64 converts the IPv4 address of the IPv4 device 150 to a fake IPv6 address for the destination device 150. This fake IPv6 address of the IPv4 device 150 is presented to the IPv6 mobile device 110, 110' as if the destination device 150 were also running IPv6.

The NAT64 123, 123' that sits between the mobile device 110, 110' and the destination device 150 is configured to convert the IPv4 packets from the destination device 150 to IPv6 packets using the fake IPv6 address assigned by the DNS64 130, 103' for receipt by the IPv6 mobile device 110, 110'. Similarly, the NAT64 123, 123' is configured to convert the IPv6 packets from the mobile node 110, 110' to IPv4 packets for the destination device 150.

Figure 8:
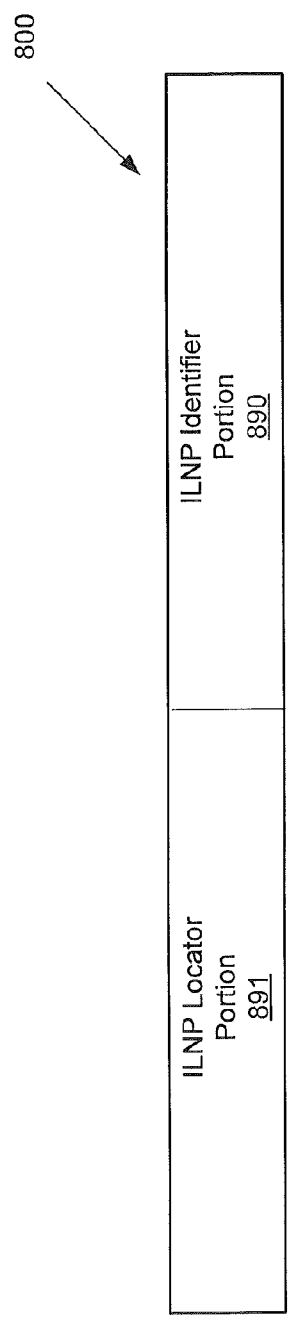
FIG. 8 is a block diagram of an ILNP address including an identifier portion and a locator portion in accordance with some embodiments of the present inventive concept.

Referring now to FIG. 1, when the mobile node 110 in the first network 120 beings operation in the IPv6 network, the mobile node 110 sends a DNS Update registering its ILNP information with the DNS server 140. In other words, the mobile node 110 registers its ILNP identifier in the DNS server 140 with its associated/selected ILNP locator(s). In some embodiments, this may be accomplished by the mobile node 110 sending the message to the DNS64 130, which would then send the message on to the DNS server 140. When the mobile node 110 decides to establish a session with the IPv4 device 150, the mobile node 110 will send a DNS lookup to the DNS64 130. As discussed above, as illustrated in FIG. 8 below, the ILNP address 800 includes both a static ILNP identifier portion 890 and an ILNP locator portion 891. Responsive to the DNS lookup, the DNS64 130 assigns a fake IPv6 address to the IPv4 device 150 and provides this fake IPv6 address to the mobile node 110 as if it were the real address of the destination device 150. The mobile node 110 uses the fakeIPv6 address to connect to the IPv4 device 150 while the NAT64 123 translates the headers of the packets.

Referring now to FIG. 2, when the mobile node 110' moves to the second network 120', the mobile node 110' sends an ILNP DNS update to the DNS server 140 to update its ILNP locator(s), i.e. to inform the DNS server that the mobile node 110' has moved from the first network 120 to the second network 120'. As is understood, the ILNP identifier stays static during the session. In a conventional system, when the mobile node 110, 110' moves from the first network 120 to the second network 120', the mobile node 110, 110' will lose its current session after the ILNP locator(s) are updated at the DNS server 140 as the mobile node 110, 110' will stop using the NAT64 123 in first network 120 and start using the NAT64 123' in the second network 120'. Losing the session when switching between NAT64 123 and NAT64 123' affects the seamless operation of the network.

Accordingly, some embodiments of the present inventive concept enable seamless connectivity between Internet protocol version 6 (IPv6) only end user devices and Internet Protocol version 4 (IPv4) destinations by enabling a full ILNP session therebetween. In particular, embodiments of the present inventive concept provide an improved NAT64, referred to herein as "NAT64+", and improved DNS64, referred to herein as "DNS64+". Use of the NAT64+ and the DNS64+ in combination with a virtual root server enable a mobile device to maintain the session even when moving between multiple networks in the same domain. The virtual root server allows foreign/visited NAT64+ and DNS64+ to learn about the mobile node and related ongoing sessions with IPv4 destination devices and take the necessary steps to provide seamless mobility of the mobile node, i.e. the session can be maintained through multiple NAT64+s. Thus, embodiments of the present inventive concept provide seamless network centric IP mobility as will be discussed further herein with respect to FIGS. 3 through 14.

As used herein, a "foreign/visited" NAT64+ is a NAT64+ positioned in a network different from the network the mobile node was present in when the session was established, i.e. not the home NAT64+. Similarly, a "foreign/visited" DNS64+ is a DNS64+ positioned in a network different from the network the mobile node was present in when the session was established, i.e. not the home DNS64+. Furthermore, as used herein, NAT64+(X) and DNS64+(X) notations refer to a NAT64+ and DNS64+ entities in accordance with embodiments discussed herein running in Network X.

The assumption is that, generally, operators interested in deploying ILNP would prefer to avoid going through another major update to their client devices and, instead, turn on ILNP in parallel with IPv6. Furthermore, embodiments of the present inventive concept assume that a hierarchical DNS64+ entities in accordance with embodiments discussed herein have been distributed within the domain, for example, Domain A. The root of such distribution is called "Domain virtual root 64" or "root 64." Root64, referred to herein as virtual root server, is configured to store bindings between ILNP identifiers and can be securely reached by any DNS64+ entities within the Domain. A virtual root server cannot be reached by a DNS64+ entity located outside its assigned domain. Between different Domains, virtual root servers communicate with virtual root servers.

It is further assumed that the mobile node will continue to use ILNP while roaming between different networks and across different NAT64+s located within a particular Domain. As used herein, the IPv4 devices (destinations) are considered to be static devices/destinations, i.e. these are not mobile nodes.

FIGS. 3-6 are block diagrams illustrating various aspects of systems including NAT64+s, DNS64+s and virtual root servers in accordance with embodiments of the present inventive concept. Embodiments and operations in accordance with the inventive concept will now be discussed with respect to FIGS. 3-6.

Figure 3:
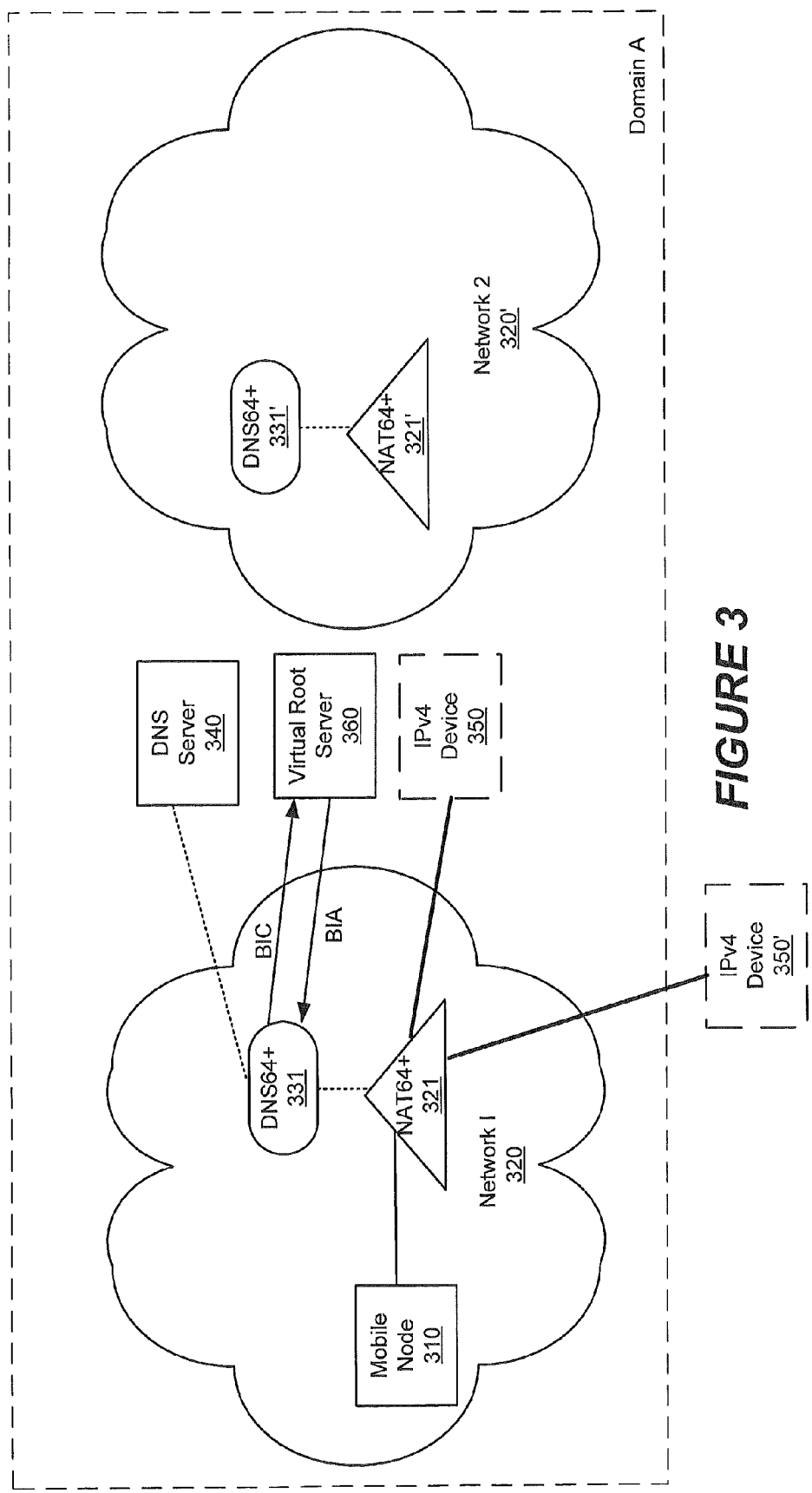
FIGS. 3 through 6 are block diagrams of communication systems in accordance with some embodiments of the present inventive concept.

Referring first to FIG. 3, the Domain A includes first and second networks 320, 320', a domain name server (DNS) server 340, a virtual root server 360 and an IPv4 device (destination device) 350. It will be understood that although Domain A only includes two networks and a single DNS server, virtual root server and destination device, embodiments of the present inventive concept are not limited to this configuration. For example, any number of each of these components may be present in Domain A without departing from the scope of the present inventive concept.

As illustrated in FIG. 3, the destination device 350 can be located in Domain A or anywhere else outside Domain A without departing from the scope of the present inventive concept. The destination device 350 is illustrated outside Domain A in FIGS. 4-6 for ease of discussion; however, embodiments are not limited to this configuration.

As further illustrated in FIG. 3, each network 320, 320' in Domain A includes a NAT64+ 321, 321' and a DNS64+ 331, 331'. The mobile node 310 is positioned in the first network 320 in FIG. 3. The mobile node 310 is an ILNP-enabled mobile node running IPv6, which is attached to an ILNP enabled network 320. When the mobile node 310 attempts to connect to the IPv4 device 350, the mobile node 310 runs a DNS lookup, which involves the DNS64+ 331, as illustrated in FIG. 3. The DNS64+ 331 sends a binding identifiers create (BIC) message to the virtual root server 360 as illustrated in FIG. 3. The BIC message includes an ILNP address of the mobile node 310 running IPv6, a fake ILNP address of a destination device 350 running IPv4 assigned by the DNS64+ and an ILNP address of the DNS64+ server (home DNS64+). The fake ILNP address for the destination device 350 includes a full "real" address of the destination device 350 in the identifier portion of the fake ILNP address. In some embodiments, the BIC message may further include a time stamp.

As discussed above, the ILNP address 800 of FIG. 8 of the mobile node includes an identifier portion 890 and a locator portion 891. The identifier portion 890 is static during a session and is configured to identify the mobile node during the session. The locator portion 891 is dynamic and identifies at least one current location of the mobile node.

As used herein, the "home" DNS64+ or NAT64+ is the DNS64+ or the NAT64+ in the network the mobile node was in when the session was established. As used herein, the "real" address of the destination device 350 is the actual IPv4 address of the destination device 350, i.e. not the "fake" address assigned by the DNS64+.

Upon receiving the BIC message, the virtual root server 360 creates a binding between the ILNP address of the mobile node 310 and the fake ILNP address of the destination device 350 and stores the binding at the virtual root server 360. The virtual root server sends a binding identifier acknowledgement (BIA) message to the DNS64+ server.

Figure 4:
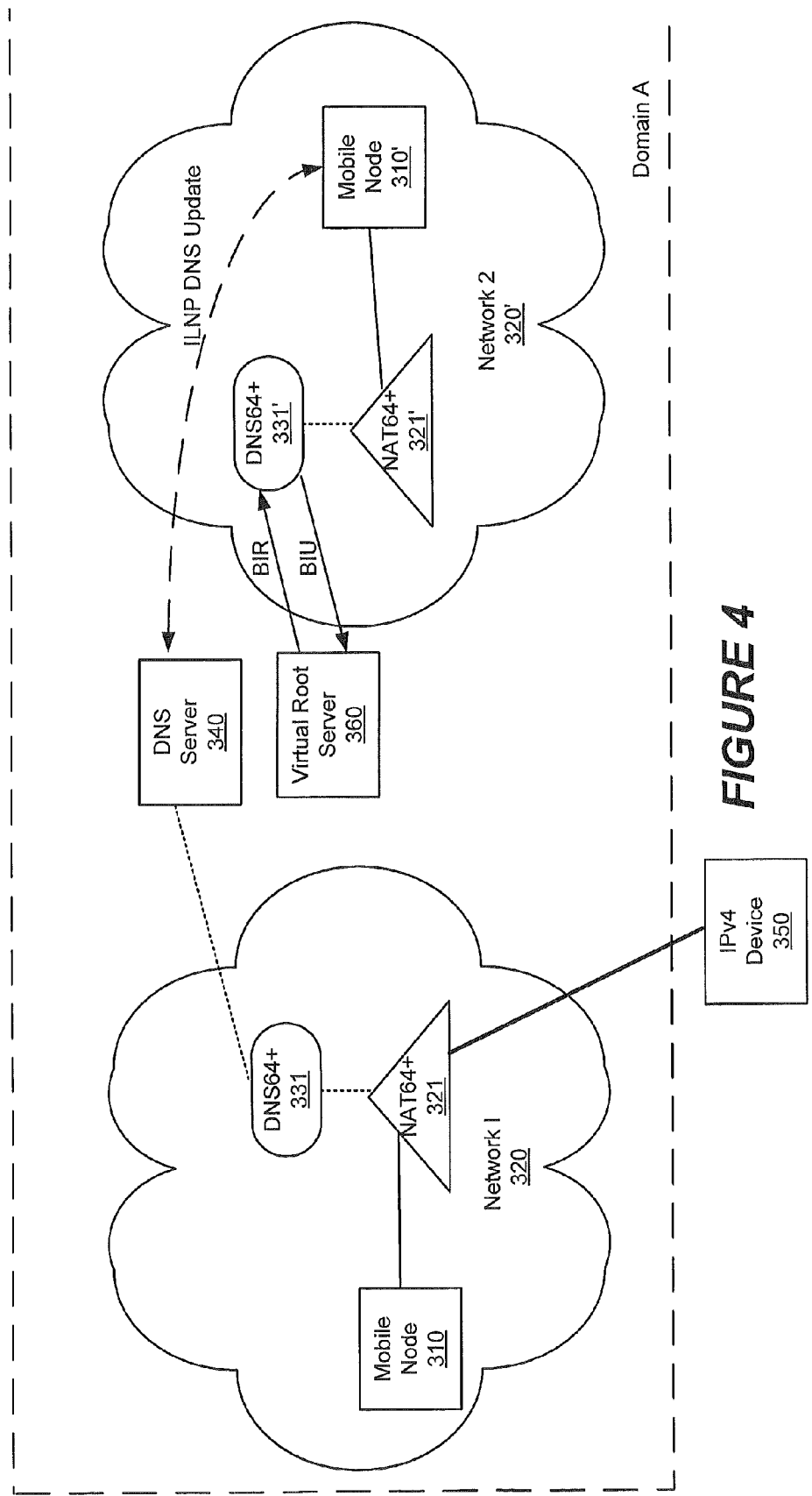

Referring now to FIG. 4, each time the mobile node 310 attaches to a new network, it gets a new ILNP locator, but the ILNP identifier stays static. When the mobile node 310, 310' gets a new locator, it has to update the DNS entry for the mobile node during the current session. Thus, as illustrated in FIG. 4, the mobile node 310' has moved into the second network 320' and now sends an ILNP DNS update to the DNS server 340. The DNS64+ 331' obtains updated locator information based on an identifier associated with the mobile node 310' that is included in the ILNP DNS update message and updates the virtual root server 360 with the new locator(s). In particular, as illustrated in FIG. 4, the DNS64+ 331' (visited DNS64+) is configured to send a binding identifier update (BIU) message to the virtual root server 360. The BIU message includes both the static identifier portion of the ILNP address of the mobile node 310' and the new ILNP locator portion of the ILNP address of the mobile node 310'. It will be understood that the DNS64+ 331' only needs to perform this operation once upon device attachment. It will be understood that the BIU message is used when the visited DNS64+ 331' is not creating a new fake ILNP address.

Responsive to receipt of the BIU message from the DNS64+ 331', the virtual root server 360 is configured to determine if at least one binding exists for the mobile node 310' based on the static identifier portion of the ILNP address of the mobile node. In other words, the virtual root server 360 checks its cache to see if a binding exists for the mobile node 310' having the static identifier associated therewith. The virtual root server 360 then sends a binding identifier response (BIR) message to the DNS64+ 331'. The BIR message either indicates that no binding currently exists for the mobile node 310' if it is determined that at least one binding does not exist in its cache for the mobile node 310' having the associated identifier; or provides a list of all available bindings for the mobile node 310' if it is determined that at least one binding exists in its cache.

Figure 5:
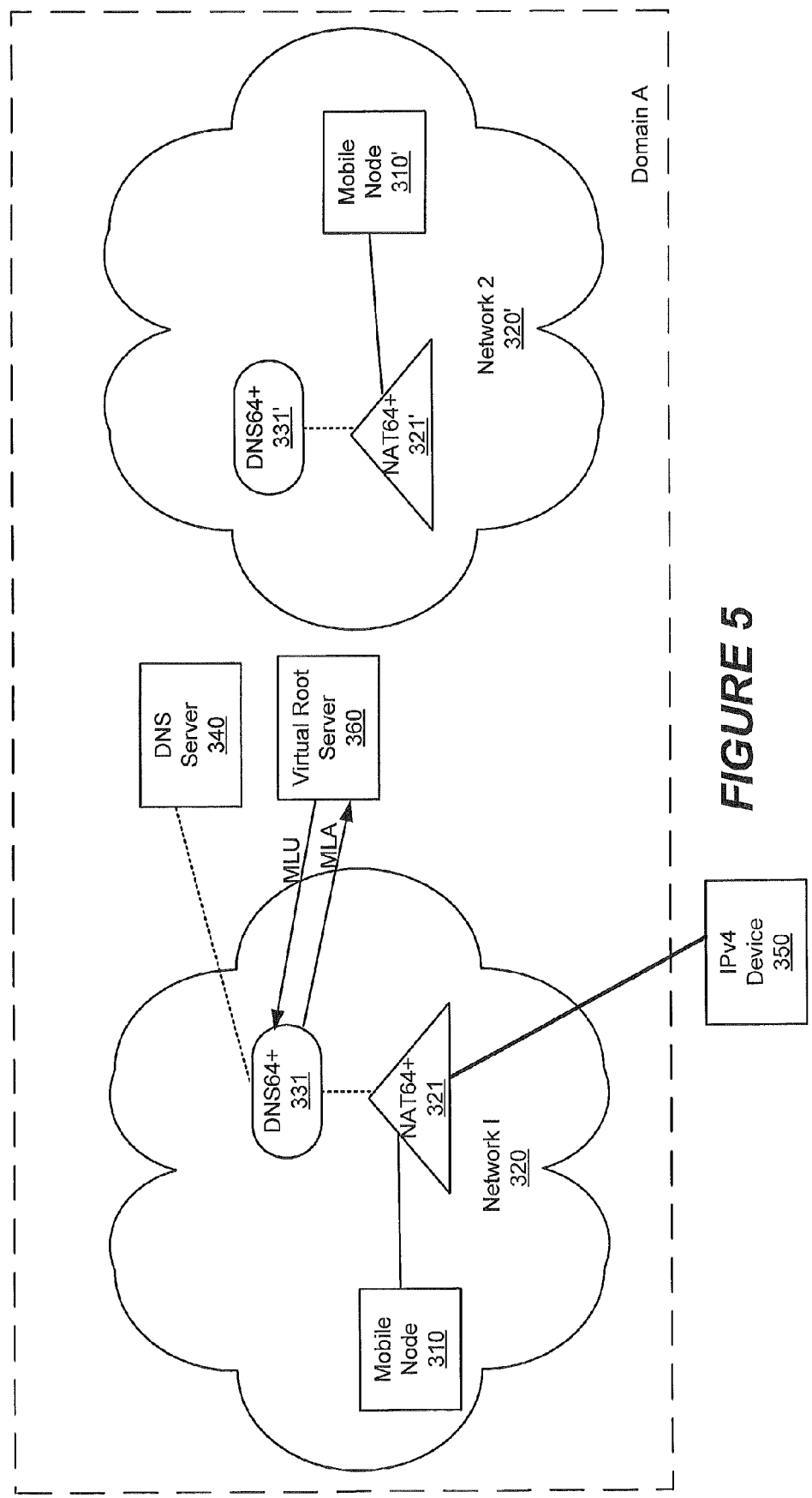

Referring now to FIG. 5, receipt of the BIU triggers the virtual root server 360 to alert the home DNS64+ 331 that the mobile node has new locator(s). Thus, as illustrated in FIG. 5, the virtual root server 360 is configured to send a mobile locator update (MLU) message to the home DNS64+ 331. Thus, the MLU includes the new locator(s) for the mobile node 310' having the associated identifier. The communication between the virtual root server 360 and the home DNS64+ 331 is possible because upon creating the binding in its cache, the virtual root server 360 also stores the ILNP address of the DNS64+ 331 that sends the BIC discussed above with respect to FIG. 3. The home DNS64+ 331 is configured to send a mobile locator acknowledgement (MLA) message to the virtual root server 360 responsive to receipt of the MLU message. It will be understood that the mobile node 310, 310' is not involved or aware of this exchange between the virtual root server 360 and the DNS64+ 331, thus, enabling a more seamless process in accordance with embodiments discussed herein.

Figure 6:
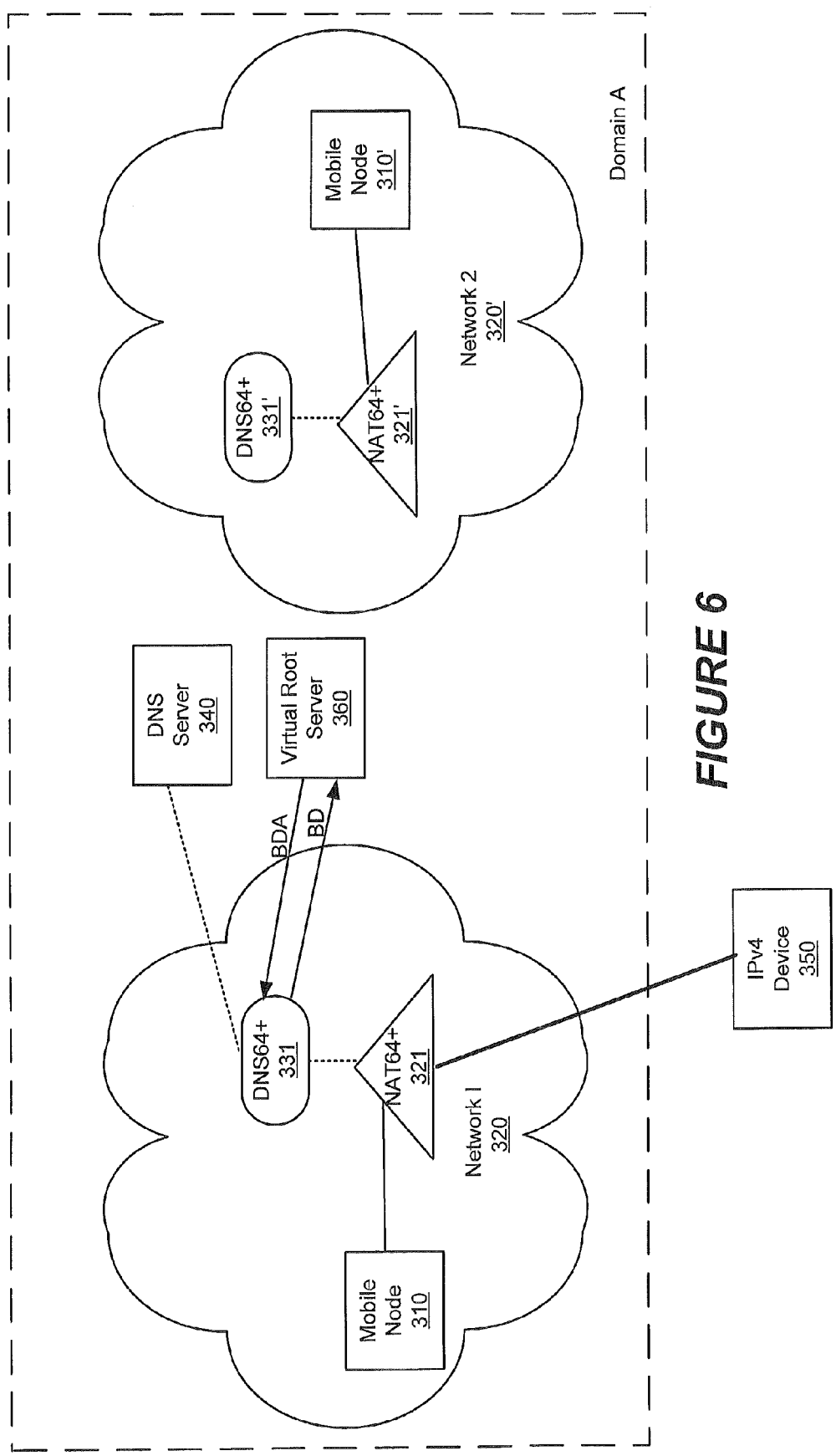

Referring now to FIG. 6, whenever the home NAT64+ 321 removes a binding between a fake ILNP address associated with the destination device 350 and the ILNP of the mobile device 310, 310', it alerts the DNS64+ 331. The DNS64+ 331 requests that the virtual root server 360 remove the binding from its cache. In particular, the DNS64+ 331 sends a binding delete (BD) message to the virtual root server 360 requesting removal of the binding.

The virtual root server 360 receives the BD message from the home DNS64+ 331 and determines if the binding between the ILNP address for the mobile node and the fake ILNP address for the destination device exists. If the binding exists in the cache at the virtual root server 360, the virtual root server 360 removes the binding at the virtual root server 360 and sends a binding delete acknowledgment (BDA) message to the home DNS64+ 331. In this scenario, the BDA indicates removal of the requested binding.

However, if it is determined that no binding exits in the cache of the virtual root server 360, the BDA message indicates that no binding between the ILNP address for the mobile node 310, 310' and the fake ILNP address for the destination device 350 exists. It will be understood that only the DNS64+ that creates a binding at the virtual root server can delete the binding.

Figure 7:
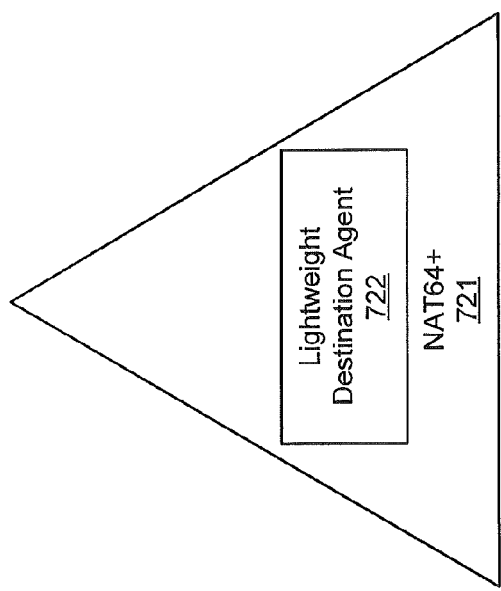
FIG. 7 is a block diagram of a network address translator 64+ (NAT64+) in accordance with some embodiments of the present inventive concept.

As illustrated in FIG. 7, in some embodiments of the present inventive concept, the NAT64+ 721 includes a lightweight destination agent (LDA) 722. The LDA allows virtual dynamic anchoring of a session as will be discussed further below.

Figure 9:
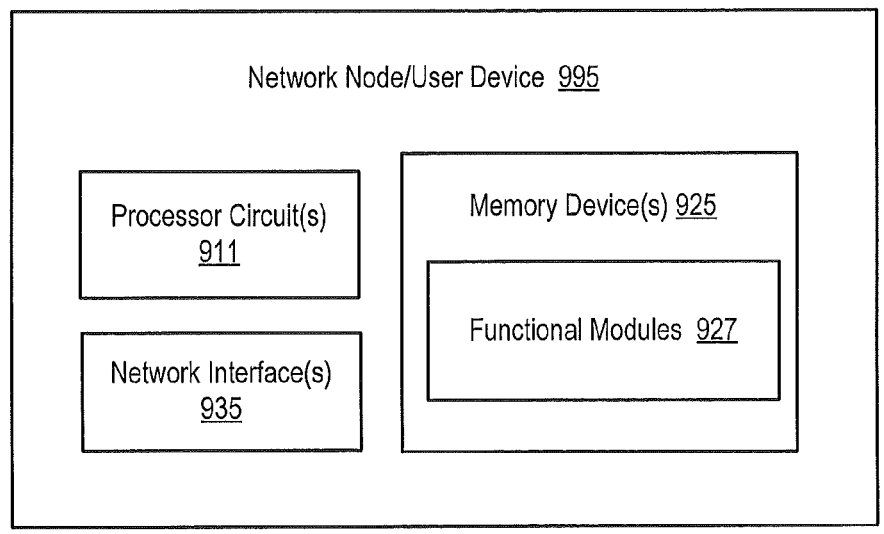
FIG. 9 is a block diagram of a network node/user device in accordance with some embodiments of the present inventive concept.

Referring now to FIG. 9, a block diagram of a network node and/or user device 995 in accordance with some embodiments will be discussed. When used for a network node, the illustrated components may be included in any component of the communication system illustrated in FIGS. 3-6. When implemented as the user device, the illustrated components may be included in the user phone device and/or the user network device without departing from the scope of the present inventive concept.

The user network device can be any type of electronic communication device that can operated by a user to initiate or receive calls, and may include, but is not limited to, fixed/mobile/transportable terminals (e.g., smart phones, tablet computers, etc.), televisions, gaming consoles, and desktop computers.

As illustrated in FIG. 9, the network node/user device 995 includes a processor circuit 911, memory circuitry/devices 925, and one or more network interfaces 935. The one or more network interfaces 935 can include any type of wired and/or wireless communication interface (e.g., cellular, wireless local area network, wireless metropolitan area network, etc.).

The processor circuit 911 may include one or more data processing circuits, such as a general purpose and/or special purpose processor (e.g., microprocessor and/or digital signal processor). The processor circuit 911 is configured to execute computer program instructions from functional modules 927 in the memory devices 925, described below as a computer readable medium, to perform some or all of the operations and methods that are described above for one or more of the embodiments disclosed herein, such as the embodiments of FIGS. 3-8 and 10-14.

As discussed above, the DNS64+ in accordance with embodiments discussed herein communicates with the virtual root server to enable seamless mobility. Examples of implementation of the NAT64+, DNS64+ and virtual root server in accordance with embodiments of the present inventive concept will be discussed.

Referring back to FIGS. 3-6, when the mobile node 310 establishes a connection with the IPv4 device 350, the IPv4 device is assigned a fake ILNP address by the DNS64+ 331. Assigning the IPv4 device a fake ILNP address instead of a fake IPv6 address may allow the locator portion of the fake ILNP address to change freely without impacting the session continuity or requiring unnecessary tunneling to the mobile node. Some embodiments of the present inventive concept use a fake ILNP locator for the IPv4 device, the locator is also configured by the home NAT64+ ILNP address. As discussed above, the virtual root server 360 creates a binding between the mobile node's 310 ILNP address and the fake ILNP address assigned to the IPv4 device 350. As discussed above, the fake ILNP address includes a real address of the IPv4 device 350 in the identifier portion thereof.

In other words, the fake ILNP identifier allows insertion of all necessary information in the 64 bit length space of the identifier portion of the ILNP address. In particular, the leftmost 32 bits of the 64 bit fake ILNP identifier includes the real address of the IPv4 device 350. As discussed above with respect to FIG. 7, each NAT64+ in accordance with embodiments discussed herein includes an LDA. The LDA allows virtual dynamic anchoring of the session with the real destination. When using ILNP, the mobile node 310 does not use a mobility anchor point. The static anchoring remains at the home NAT64+ 321.

Using the fake ILNP address assigned by the DNS64+(1) 331 (the DNS64+ of network 1 320), the mobile node 310 establishes a session with the IPv4 device 350, which consists of exchanging ILNP packets with the NAT64+(1) 321 (the NAT64+ of network 1 320).

Upon switching to Network 2 320', the mobile node 310' follows ILNP procedure and updates its DNS with its new locator(s) obtained from network 2 320'. It will be understood that using the mobile node's identifier sent in the ILNP DNS update, the DNS64+(2) 331' updates the virtual root server 360 and also discovers the existing binding which involves the home NAT64+ 321 (NAT64+(1)). The virtual root server 360 updates the home DNS64+ 331 with the new ILNP locator associated with the mobile node 310'.

After receiving an update from the virtual root server 360, the home DNS64+ 331 alerts the home NAT64+ 321 about the new locator associated with the mobile node 310'. Thus, the home NAT64+ 321 translates the incoming IPv4 packets to the correct ILNP locator for the mobile node. For at least these reasons, embodiments of the present inventive concept provide more seamless communications between IPv6 and IPv4 devices.

Figure 10:
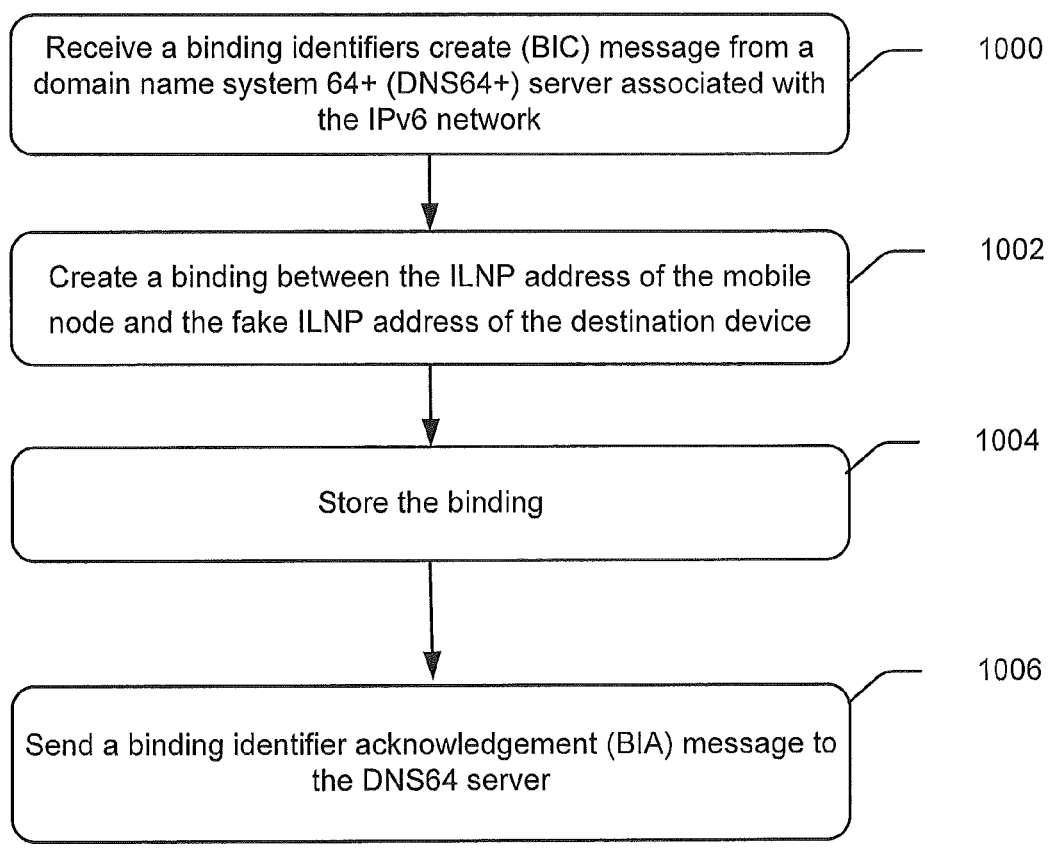
FIGS. 10-14 are flow charts illustrating operations and methods for communicating between at least one identifier locator network protocol (ILNP) enabled mobile node running Internet protocol version 6 (IPv6) and a destination device running IPv4 in accordance with some embodiments of the present inventive concept.

Operations in accordance with some embodiments of the present inventive concept will now be discussed with respect to the flow charts of FIGS. 10-14. Referring first to FIG. 10, operations for communicating between at least one ILNP enabled mobile node running IPv6 and a destination device running IPv4 will be discussed. The mobile node is attached to an IPv6 network in an IPv6 domain. Operations begin at block 1000 by receiving, at a virtual root server, a BIC message from a DNS64+ associated with the IPv6 network. The BIC message includes an ILNP address of the mobile node running IPv6, a fake ILNP address of a destination device running IPv4 assigned by the DNS64+ and an ILNP address of the DNS64+. The fake ILNP address includes a full real address of the destination device. A binding is created between the ILNP address of the mobile node and the fake ILNP address of the destination device (block 1002). The binding is stored at the virtual root server (block 1004). A BIA message is sent to the DNS64+ (block 1006). In some embodiments, the BIC message may include a time stamp.

As discussed above, the ILNP address of the mobile node includes an identifier portion and a locator portion. The identifier portion is static during a session and identifies the mobile node during the session. The locator portion is dynamic and identifies at least one current location of the mobile node.

Figure 11:
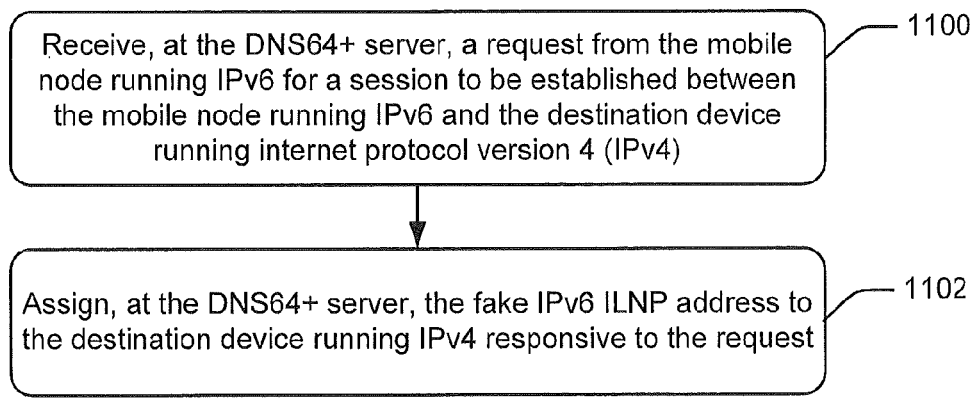
Figure 12:
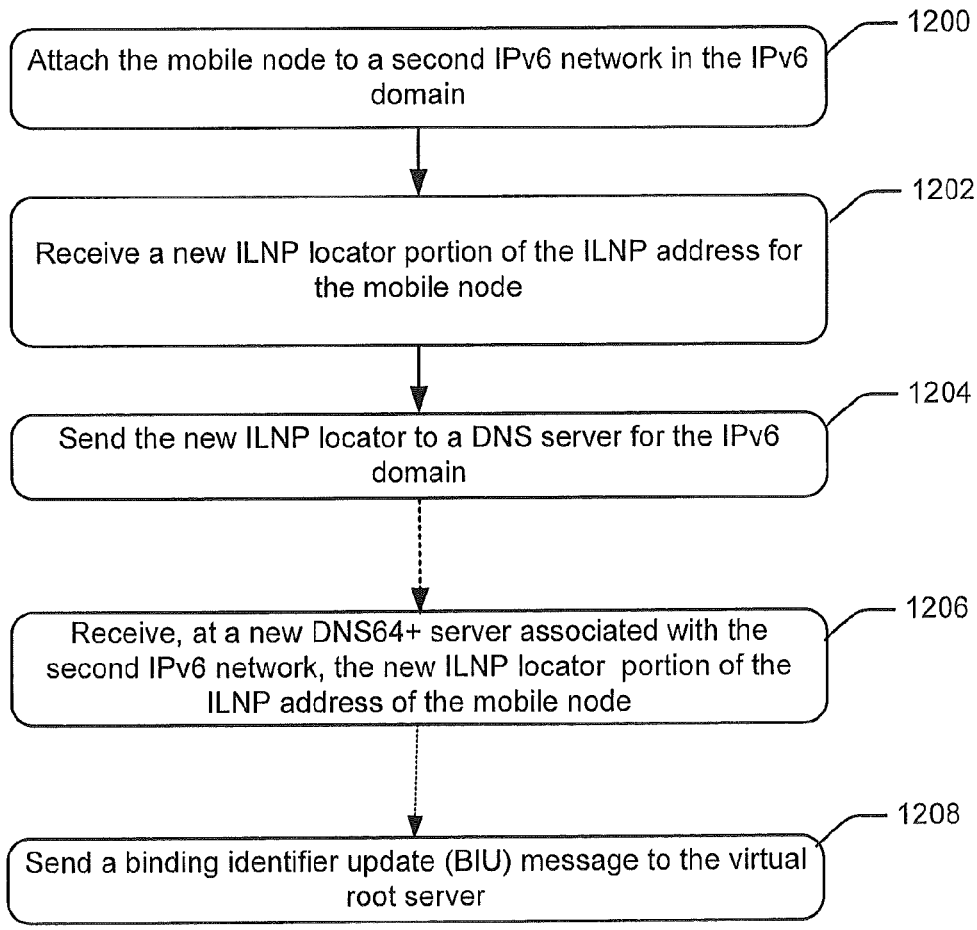

Referring now to FIG. 11, operations of block 1000 of FIG. 10 are preceded by operations of blocks 1100 and 1102 of FIG. 12. Operations begin at block 1100 by receiving, at a DNS64+ server, a request from the mobile node running IPv6 for a session to be established between the mobile node running IPv6 and the destination device running internet protocol version 4 (IPv4). The DNS64+ assigns the fake IPv6 ILNP address to the destination device running IPv4 responsive to the request (block 1102).

Referring now to FIG. 12, the IPv6 network may be a first IPv6 network in the IPv6 domain and wherein the DNS64+ may be a home DNS64+. Operations continue at block 1200 by attaching the mobile node to a second IPv6 network in the IPv6 domain. A new ILNP locator portion of the ILNP address is received for the mobile node (block 1202). The new ILNP locator is sent to a DN64+ server for the IPv6 domain (block 1204). At a new DNS64+ associated with the second IPv6 network, the new ILNP locator portion of the ILNP address of the mobile node is received (block 1206). A BIU message is sent to the virtual root server (block 1208). The BIU message includes the static identifier portion of the ILNP address of the mobile node and the new ILNP locator portion of the mobile node.

Figure 13:
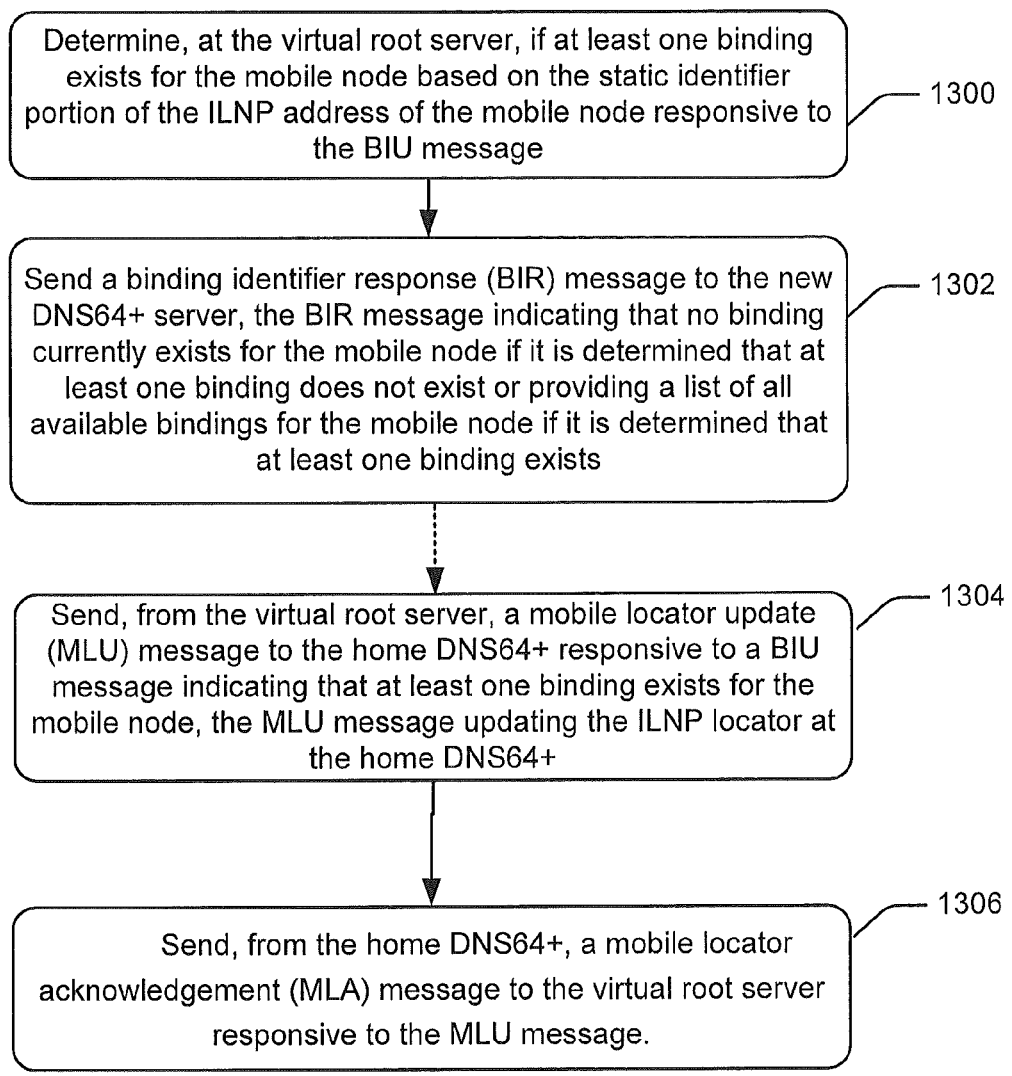

Referring now to FIG. 13, operations continue at block 1300 by determining, at the virtual root server, if at least one binding exists for the mobile node based on the static identifier portion of the ILNP address of the mobile node responsive to the BIU message (block 1300). A BIR message is sent to the new DNS64+ (block 1302). The BIR message indicates that no binding currently exists for the mobile node if it is determined that at least one binding does not exist; or provides a list of all available bindings for the mobile node if it is determined that at least one binding exists. An MLU message is sent from the virtual root server to the home DNS64+ responsive to a BIU message indicating that at least one binding exists for the mobile node (block 1304). The MLU message updates the ILNP locator at the home DNS64+. An MLA message is sent from the home DNS64+ to the virtual root server responsive to the MLU message (block 1306).

Figure 14:
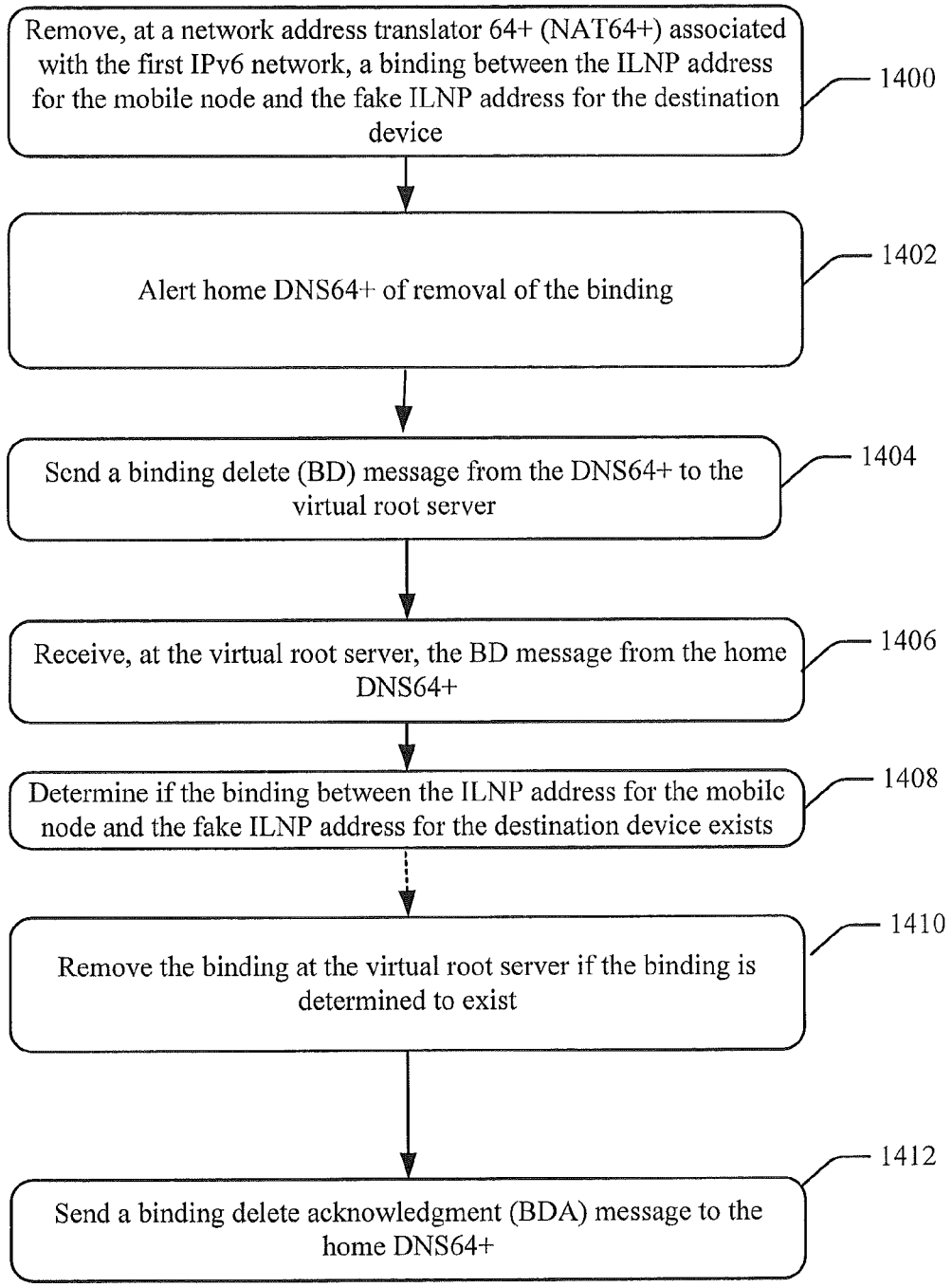

Referring now to FIG. 14, operations continue at block 1400 by removing, at a NAT64+ associated with the first IPv6 network, a binding between the ILNP address for the mobile node and the fake ILNP address for the destination The home DNS64+ is alerted of removal of the binding (block 1402). A BD message is sent from the home DNS64+ to the virtual root server (block 1404). The BD message is received at the virtual root server from the home DNS64+ (block 1404). It is determined if the binding between the ILNP address for the mobile node and the fake ILNP address for the destination device exists (block 1406). The binding at the virtual root server is removed if the binding is determined to exist (block 1408). A BDA message is sent to the home DNS64+ (block 1410). The BDA message may indicate that no binding between the ILNP address for the mobile node and the fake ILNP address for the destination device exists if it is determined that the binding does not exist.

In the above-description of various embodiments of the present inventive concept, it is to be understood that the terminology used herein is for the purpose of describing particular embodiments only and is not intended to be limiting of the inventive concept. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" or "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the non-transitory computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present inventive concept may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concept. All such variations and modifications are intended to be included herein within the scope of the present inventive concept.

What is claimed is:

1. A system including at least one identifier locator network protocol (ILNP) enabled mobile node running Internet protocol version 6 (IPv6), the mobile node being attached to an IPv6 network in an IPv6 domain, the system comprising:
    a virtual root server configured to:
    receive a binding identifiers create (BIC) message from a domain name system 64 (DNS64) server associated with the IPv6 network, wherein the BIC message includes an ILNP address of the mobile node running IPv6, a fake ILNP address of a destination device running IPv4 assigned by the DNS64 server and an ILNP address of the DNS64 server and wherein the fake ILNP address includes a full real address of the destination device; and
    create a binding between the ILNP address of the mobile node and the fake ILNP address of the destination device;
    store the binding; and
    send a binding identifier acknowledgement (BIA) message to the DNS64 server.

2. The system of claim 1, wherein the DNS64 server is configured to receive a request from the mobile node running IPv6 for a session to be established between the mobile node running IPv6 and the destination device running internet protocol version 4 (IPv4) and assign the fake IPv6 ILNP address to the destination device running IPv4 responsive to the request.

3. The system of claim 1, wherein the BIC message further includes a time stamp.

4. The system of claim 1:
    wherein the ILNP address of the mobile node includes an identifier portion and a locator portion;
    wherein the identifier portion is static during a session and is configured to identify the mobile node during the session; and
    wherein the locator portion is dynamic and identifies at least one current location of the mobile node.

5. The system of claim 4:
    wherein the IPv6 network comprises a first IPv6 network in the IPv6 domain and wherein the DNS64 server comprises a home DNS64 server; and
    wherein the mobile node attaches to a second IPv6 network in the IPv6 domain, receives a new ILNP locator portion of the ILNP address for the mobile node and sends the new ILNP locator to a DNS server for the IPv6 domain,
    the system further comprising a new DNS64 server associated with the second IPv6 network that is configured to receive the new ILNP locator portion of the ILNP address of the mobile node and send a binding identifier update (BIU) message to the virtual root server, the BIU message including the static identifier portion of the ILNP address of the mobile node and the new ILNP locator portion of ILNP address of the mobile node.

6. The system of claim 5, wherein the virtual root server is further configured to:
    determine if at least one binding exists for the mobile node based on the static identifier portion of the ILNP address of the mobile node responsive to the BIU message; and
    send a binding identifier response (BIR) message to the new DNS64 server, the BIR message indicating that no binding currently exists for the mobile node if it is determined that at least one binding does not exist or providing a list of all available bindings for the mobile node if it is determined that at least one binding exists.

7. The system of claim 6, wherein the virtual root server is further configured to send mobile locator update (MLU) message to the home DNS64 responsive to a BIU message indicating that at least one binding exists for the mobile node, the MLU message updating the ILNP locator at the home DNS64.

8. The system of claim 7, wherein the home DNS64 is configured to send a mobile locator acknowledgement (MLA) message to the virtual root server responsive to the MLU message.

9. The system of claim 8, further comprising a network address translator 64 (NAT64) associated with the first IPv6 network, the NAT64 configured to:
remove a binding between the ILNP address for the mobile node and the fake ILNP address for the destination device; and
alert the home DNS64 of removal of the binding such that the DNS64 sends a binding delete (BD) message from the home DNS64 to the virtual root server.

10. The system of claim 9, wherein the virtual root server is further configured to:
receive the BD message from the home DNS64;
determine if the binding between the ILNP address for the mobile node and the fake ILNP address for the destination device exists;
remove the binding at the virtual root server if the binding is determined to exist; and
send a binding delete acknowledgment (BDA) message to the home DNS64.

11. The system of claim 10, wherein the BDA message indicates that no binding between the ILNP address for the mobile node and the fake ILNP address for the destination device exists if it is determined that the binding does not exist.

12. The system of claim 1, wherein the fake ILNP address of the destination device comprises a locator portion and an identifier portion, the identifier portion being a 64 bit length space including a 32 bit identifier of the full real address of the destination device.

13. The system of claim 12, further comprising a network address translator 64 (NAT64) associated with the IPv6 network, the NAT64 comprising a lightweight destination agent (LDA) allowing virtual dynamic anchoring of a session.

14. A method for communicating between at least one identifier locator network protocol (ILNP) enabled mobile node running Internet protocol version 6 (IPv6) and a destination device running IPv4, the mobile node being attached to an IPv6 network in an IPv6 domain, the method comprising:
receiving, at a virtual root server, a binding identifiers create (BIC) message from a domain name system 64 (DNS64) server associated with the IPv6 network, wherein the BIC message includes an ILNP address of the mobile node running IPv6, a fake ILNP address of a destination device running IPv4 assigned by the DNS64 server and an ILNP address of the DNS64 server and wherein the fake ILNP address includes a full real address of the destination device; and
creating a binding between the ILNP address of the mobile node and the fake ILNP address of the destination device;
storing the binding; and
sending a binding identifier acknowledgement (BIA) message to the DNS64 server.

15. The method of claim 14, further comprising:
receiving, at the DNS64 server, a request from the mobile node running IPv6 for a session to be established between the mobile node running IPv6 and the destination device running internet protocol version 4 (IPv4); and
assigning, at the DNS64 server, the fake IPv6 ILNP address to the destination device running IPv4 responsive to the request.

16. The method of claim 14, wherein the BIC message further includes a time stamp.

17. The method of claim 14:
wherein the ILNP address of the mobile node includes an identifier portion and a locator portion;
wherein the identifier portion is static during a session and identifies the mobile node during the session; and
wherein the locator portion is dynamic and identifies at least one current location of the mobile node.

18. The method of claim 17, wherein the IPv6 network comprises a first IPv6 network in the IPv6 domain and wherein the DNS64 server comprises a home DNS64 server, the method further comprising:
attaching the mobile node to a second IPv6 network in the IPv6 domain;
receiving a new ILNP locator portion of the ILNP address for the mobile node;
sending the new ILNP locator to a DNS server for the IPv6 domain;
receiving, at a new DNS64 server associated with the second IPv6 network, the new ILNP locator portion of the ILNP address of the mobile node; and
sending a binding identifier update (BIU) message to the virtual root server, the BIU message including the static identifier portion of the ILNP address of the mobile node and the new ILNP locator portion of the ILNP address the mobile node.

19. The method of claim 18, further comprising:
determining, at the virtual root server, if at least one binding exists for the mobile node based on the static identifier portion of the ILNP address of the mobile node responsive to the BIU message; and
sending a binding identifier response (BIR) message to the new DNS64 server, the BIR message indicating that no binding currently exists for the mobile node if it is determined that at least one binding does not exist or providing a list of all available bindings for the mobile node if it is determined that at least one binding exists.

20. The method of claim 19, further comprising sending, from the virtual root server, a mobile locator update (MLU) message to the home DNS64 responsive to a BIU message indicating that at least one binding exists for the mobile node, the MLU message updating the ILNP locator at the home DNS64.

21. The method of claim 20, further comprising sending, from the home DNS64, a mobile locator acknowledgement (MLA) message to the virtual root server responsive to the MLU message.

22. The method of claim 21, further comprising:
removing, at a network address translator 64 (NAT64) associated with the first IPv6 network, a binding between the ILNP address for the mobile node and the fake ILNP address for the destination device; and
alerting the home DNS64 of removal of the binding; and
sending a binding delete (BD) message from the home DNS64 to the virtual root server.

23. The method of claim 22, further comprising:
receiving, at the virtual root server, the BD message from the home DNS64;
determining if the binding between the ILNP address for the mobile node and the fake ILNP address for the destination device exists;
removing the binding at the virtual root server if the binding is determined to exist; and
sending a binding delete acknowledgment (BDA) message to the home DNS64.

24. The method of claim 23, wherein the BDA message indicates that no binding between the ILNP address for the mobile node and the fake ILNP address for the destination device exists if it is determined that the binding does not exist.

25. The method of claim 14, wherein the fake ILNP address of the destination device comprises a locator portion and an identifier portion, the identifier portion being a 64 bit length space including a 32 bit identifier of the full real address of the destination device.

* * * * *

UNITED STATES PATENT AND TRADEMARK OFFICE
CERTIFICATE OF CORRECTION

| | | |
|---|---|---|
| PATENT NO. | : 9,185,071 B2 | Page 1 of 1 |
| APPLICATION NO. | : 13/732044 | |
| DATED | : November 10, 2015 | |
| INVENTOR(S) | : Haddad et al. | |

It is certified that error appears in the above-identified patent and that said Letters Patent is hereby corrected as shown below:

On the Title Page, in item (57), under "ABSTRACT", in Column 2, Line 13, delete "configures" and insert -- configured --, therefor.

In the Specification

In Column 3, Line 46, delete "server 150" and insert -- server 140 --, therefor.

Signed and Sealed this
Twenty-ninth Day of March, 2016

Michelle K. Lee
*Director of the United States Patent and Trademark Office*